United States Patent
Jidai et al.

(10) Patent No.: US 10,274,657 B2
(45) Date of Patent: Apr. 30, 2019

(54) OPTICAL FILTER AND IMAGING DEVICE

(71) Applicant: KONICA MINOLTA, INC., Chiyoda-ku (JP)

(72) Inventors: Hidetaka Jidai, Koganei (JP); Koji Nakamura, Hino (JP); Munenori Kawaji, Shinjyuku-ku (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/124,762

(22) PCT Filed: Mar. 3, 2015

(86) PCT No.: PCT/JP2015/056133
§ 371 (c)(1),
(2) Date: Sep. 9, 2016

(87) PCT Pub. No.: WO2015/137183
PCT Pub. Date: Sep. 17, 2015

(65) Prior Publication Data
US 2017/0017025 A1    Jan. 19, 2017

(30) Foreign Application Priority Data
Mar. 12, 2014 (JP) ................. 2014-048476

(51) Int. Cl.
*G02B 1/10* (2015.01)
*G02B 5/28* (2006.01)
(Continued)

(52) U.S. Cl.
CPC ............ *G02B 5/285* (2013.01); *G02B 5/208* (2013.01); *G03B 11/00* (2013.01); *H04N 5/2253* (2013.01); *H04N 5/2254* (2013.01)

(58) Field of Classification Search
CPC .... G02B 26/001; G02B 5/28; G02B 6/29353; G02B 6/29361; G02B 5/285
(Continued)

(56) References Cited

U.S. PATENT DOCUMENTS

| 7,411,729 B2 | 8/2008 | Iyama et al. |
| 7,749,622 B2 | 7/2010 | Yamada et al. |

(Continued)

FOREIGN PATENT DOCUMENTS

| JP | 64-037504 | 2/1989 |
| JP | 02-161403 | 6/1990 |

(Continued)

OTHER PUBLICATIONS

Office Action dated Sep. 11, 2018 issued in the corresponding Japanese Patent Application No. 2016-507460.

*Primary Examiner* — William Choi
(74) *Attorney, Agent, or Firm* — Cozen O'Connor

(57) ABSTRACT

In this optical filter, each side of a substrate that is at most 0.3 mm in thickness is coated with a multilayer film. Both of the multilayer films are under compressive stress, and the optical filter satisfies the relation $F \geq -1.25t + 1.525$ (where F represents the ratio of the strength of the optical filter to the strength of the substrate (the strength of the optical filter with the substrate coated divided by the strength of the uncoated substrate) and t represents the thickness of the substrate (in mm)).

19 Claims, 1 Drawing Sheet

(51) Int. Cl.
 *G03B 11/00* (2006.01)
 *G02B 5/20* (2006.01)
 *H04N 5/225* (2006.01)

(58) Field of Classification Search
 USPC .......................................... 359/588–590, 723
 See application file for complete search history.

(56) References Cited

U.S. PATENT DOCUMENTS

| | | |
|---|---|---|
| 2008/0165421 A1 | 7/2008 | Matsumoto et al. |
| 2008/0285119 A1 | 11/2008 | Iyama et al. |
| 2015/0253477 A1 | 9/2015 | Nakao |

FOREIGN PATENT DOCUMENTS

| | | | | |
|---|---|---|---|---|
| JP | H09-085874 | | 3/1997 | |
| JP | 11-202126 | | 7/1999 | |
| JP | 2006-220872 | | 8/2006 | |
| JP | 2008-152027 | | 7/2008 | |
| JP | 2008-158345 | | 7/2008 | |
| JP | 2008152027 A | * | 7/2008 | |
| JP | 2008-181121 | | 8/2008 | |
| JP | 2008181121 A | * | 8/2008 | ............. G02B 5/208 |
| JP | 2011-230944 | | 11/2011 | |
| WO | WO 2004/038061 | | 5/2004 | |
| WO | WO 2007/048195 | | 5/2007 | |
| WO | WO 2014/065373 | | 5/2014 | |

\* cited by examiner

OPTICAL FILTER AND IMAGING DEVICE

RELATED APPLICATIONS

This is a U.S. National Phase Application under 35 USC 371 of International Application PCT/JP2015/056133 filed on Mar. 03, 2015.

This application claims the priority of Japanese application no. 2014-048476 filed Mar. 12, 2014, the entire content of which is hereby incorporated by reference.

TECHNICAL FIELD

The present invention relates to optical filters and imaging devices. More particularly, the present invention relates to an optical filter comprising a substrate of which the surface is coated with a multi-layer film, and to an imaging device incorporating such an optical filter.

BACKGROUND ART

Conventionally, in digital appliances equipped with image input capabilities, such as camera-equipped mobile phones and smartphones (high-functionality mobile phones), there are commonly used, as image sensors for converting an optical image formed by an imaging lens into an electrical signal, silicon semiconductor devices (e.g., CCD (charge-coupled device) image sensors and CMOS (complementary metal-oxide semiconductor) image sensors). Silicon semiconductor devices are sensitive up to a near-infrared region; thus, when light is incident on them, they capture not only visible light but also near-infrared light as an image. This leads to problems such as pseudocolors in the taken image. This is coped with, in conventional digital appliances equipped with image input capabilities, by inserting an infrared-cut filter between the imaging lens and the image sensor.

Various types of infrared-cut filers have conventionally been proposed. For example, Patent Document 1 identified below proposes, as an infrared-cut filter for use in cameras, one in which two infrared-absorptive glass substrates are bonded together with an infrared-cut layer laid in between. Such optical filters for use in cameras are required to be increasingly slim as cameras are given increasingly low profiles. However, absorptive glass cannot be made thinner than a certain thickness; to make it thinner requires a filter that relies on interference or the like rather than absorption. Inconveniently, a thin glass substrate is liable to break, warp, or otherwise degrade.

As an optical filter less liable to warp, for example, Patent Document 2 identified below proposes one in which, on opposite sides of an extremely thin substrate, dielectric multi-layer films are respectively formed which have a symmetrical structure with respect to the substrate with a view to reducing the warp resulting from film stress. For other examples, Patent Document 3 identified below proposes an optical thin film in which the difference between the numbers of layers stacked in the multi-layer films on opposite sides is controlled to be equal to or smaller than a predetermined value so as to cancel out film stress with a view to reducing the warp, and Patent Document 4 identified below proposes a multi-layer film filter in which a multi-layer film deposited by multi-layer film sputtering has a stress in a range of ±100 MPa or less.

LIST OF CITATIONS

Patent Literature

Patent Document 1: Japanese Patent Application Publication No. 2006-220872
Patent Document 2: Japanese Patent Application Publication No. H11-202126
Patent Document 3: Japanese Patent Application Publication No. H09-085874
Patent Document 4: WO2004/038061

SUMMARY OF THE INVENTION

Technical Problem

However, Patent Documents 2 and 3 make no mention of stress on each surface. Thus, with the structures proposed there, even though stress can be canceled out and the warp can be reduced, the strength of the optical filter cannot be increased. In addition, with the optical filter proposed in Patent Document 2, due to the dielectric multi-layer films having a symmetrical structure with respect to the substrate, the optical properties obtained are extremely limited. On the other hand, with a multi-layer film with little stress like the one proposed in Patent Document 4, the substrate cannot be reinforced.

Devised against the background discussed above, the present invention aims to provide an optical filter that achieves thinness combined with high strength, and to provide an imaging device incorporating such an optical filter.

Means for Solving the Problem

To achieve the above aim, according to one aspect of the present invention, in an optical filter that comprises a substrate with a thickness of 0.3 mm or less coated on both sides with multi-layer films respectively, the multi-layer films on both sides of the substrate both have compression stress, and conditional formula (1) below is fulfilled.

$$F \geq -1.25t + 1.525 \quad (1)$$

where
F represents the strength ratio of the optical filter with respect to the substrate (the ratio of the strength of the optical filter with a coated substrate to the strength of an uncoated substrate); and
t represents the thickness of the substrate (thickness/mm), where thickness is in mm.

According to another aspect of the present invention, an imaging device comprises: an optical filter as described above; an imaging lens disposed on the light-entrance side of the optical filter; and an image sensor that receives the light incident thereon through the imaging lens and the optical filter.

Advantageous Effects of the Invention

According to the present invention, a thin substrate is coated on both sides respectively with multi-layer films having compression stress, and the strength ratio before and after the coating fulfills a predetermined condition. With this configuration, it is possible to produce an optical filter that achieves thinness combined with high strength.

DESCRIPTION OF EMBODIMENTS

Figure 1:
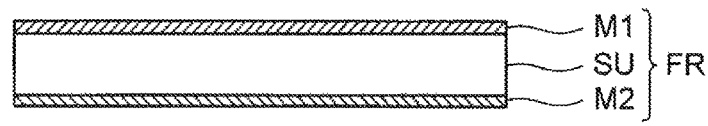
FIG. 1 is a sectional view schematically showing an optical filter according to one embodiment of the present invention.
Figure 2:
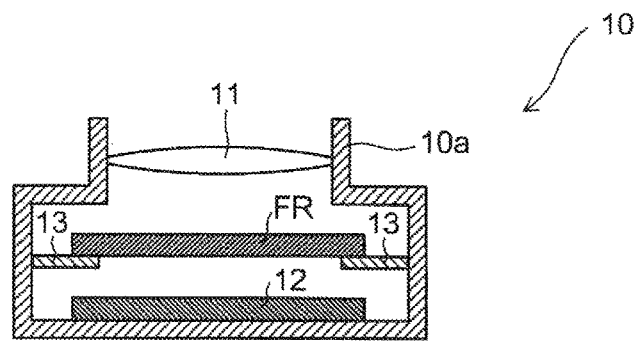
FIG. 2 is a sectional view schematically showing an imaging device incorporating the optical filter shown in FIG. 1.

Hereinafter, optical filters, imaging devices, etc. that embody the present invention will be described with reference to the accompanying drawings. FIG. 1 schematically shows a sectional structure of an optical filter FR according to one embodiment of the present invention, the optical filter FR being composed of a substrate SU (e.g., a glass substrate) with a thickness of 0.3 mm or less that is coated on both sides with multi-layer films M1 and M2 respectively. FIG. 2 schematically shows a sectional structure of an imaging device 10 incorporating the optical filter FR.

The imaging device 10 has, inside a housing 10a, an optical filter FR (e.g., an infrared-cut filter), an imaging lens 11, and an image sensor 12. The optical filter FR is supported on a side wall of the housing 10a via a support member 13. A imaging device 10 like this can be applied to digital cameras, and also to an imaging part incorporated in mobile devices.

The imaging lens 11 is disposed on the light-entrance side of the optical filter FR, and converges the incident light on the light-receiving surface of the image sensor 12. The image sensor 12 is a photoelectric conversion device that receives the light (image light) incident through the imaging lens 11 and the optical filter FR, converts it into an electrical signal, and outputs the result to the outside (e.g., to a display device). Specifically, the image sensor 12 comprises a solid-state image sensor such as a CCD image sensor or CMOS image sensor.

In the optical filter FR, the multi-layer films M1 and M2 on both sides of the substrate SU both has compression stress, and conditional formula (1) below is fulfilled.

$$F \geq -1.25t + 1.525 \quad (1)$$

where

F represents the strength ratio of the optical filter with respect to thesubstrate (the ratio of the strength of the optical filter with a coated substrate to the strength of an uncoated substrate); and t represents the thickness of the substrate (thickness/mm), where thickness is in mm.

Since a thin substrate is generally liable to bend, a multi-layer film for use in a mirror or the like tends to be given reduced stress. This results in low strength; in particular with a thickness of 0.3 mm or less, a substrate is prone to break and is difficult to handle. In an optical filter FR having a thin substrate SU with a thickness of 0.3 mm or less, one effective way to obtain so high strength as to fulfill conditional formula (1) is to coat the substrate SU on both sides purposely with multi-layer films M1 and M2 having compression stress so as to obtain well-balanced compression stress. Accordingly, with a structure where a substrate SU is coated on both sides with multi-layer films M1 and M2 having compression stress, it is possible to achieve thinness combined with high strength.

As described above, coating a substrate SU on both sides with multi-layer films M1 and M2 having compression stress helps increases the strength of the optical filter FR. The relationship between the strength ratio F and the thickness t before and after the coating is defined by conditional formula (1). The thicker the substrate SU, the lower the strength ratio F; the thinner the substrate SU, the higher the strength ratio F. Thus, to fulfill conditional formula (1), it is necessary to improve the strength ratio F more the thinner the substrate SU.

As will be understood from conditional formula (1), for example with t=0.3 mm, the optical filter FR can be given strength 1.15 times ($-1.25 \times 0.3 + 1.525 = 1.15$) or more that of the uncoated substrate. With a 0.1 mm thick substrate with extremely low strength (with t=0.1 mm), the optical filter FR can be given strength 1.4 times ($-1.25 \times 0.1 + 1.525 = 1.4$) or more that of the uncoated substrate.

According to the above-described distinctive configuration, a thin substrate is coated on both sides with multi-layer films having compression stress, and the strength ratio before and after the coating fulfills a predetermined condition. It is thus possible to produce an optical filter that achieves thinness combined with high strength. Using a resulting thin filter as an infrared-cut filter in a camera helps make the camera low-profile and compact. To follow is a description of the conditions and other features for more effectively achieving thinness combined with high strength.

It is preferable that the optical filter FR fulfill conditional formula (1a) below.

$$F \geq -1.5t + 1.65 \quad (1a)$$

Conditional formula (1a) defines, within the conditional range defined by conditional formula (1) above, a still preferable conditional range from the above-mentioned and other viewpoints. Thus, preferably, fulfilling conditional formula (1a) helps enhance the effects mentioned above.

As will be understood from conditional formula (1a), for example with t=0.3 mm, the optical filter FR can be given strength 1.2 times ($-1.5 \times 0.3 + 1.65 = 1.2$) or more that of the uncoated substrate. With a 0.1 mm thick substrate with extremely low strength (with t=0.1 mm), the optical filter FR can be given strength 1.5 times ($-1.5 \times 0.1 + 1.65 = 1.5$) or more that of the uncoated substrate.

Specific examples of the optical filter FR include infrared-cut filters. In infrared-cut filters, the multi-layer films M1 and M2 on both sides of the substrate SU are both given such an optical property as to transmit light in the visible region and reflect light in the infrared region. Thus, achieving thinness combined with high strength in them is effective in achieving slimness in digital appliances incorporating an imaging lens. For example, consider the fabrication of an infrared-cut filter that transmits light with wavelengths of 450 to 600 nm and reflect light with wavelengths of 700 nm or more. In that case, $TiO_2$ and $SiO_2$ as the components of the multi-layer films M1 and M2 are stacked in alternate layers each with an optical thickness corresponding to a quarter-wavelength (¼ the wavelength) of the infrared region (e.g., a wavelength of 900 nm). Here, for efficient transmission of light with wavelengths 450 to 600 nm, each layer is given a thickness that slightly deviates from the quarter-wavelength. This helps suppress the effect of interference. Examples of the film deposition process for the optical filter FR includes vacuum deposition, ion-assisted deposition, ion-plating, sputtering (such as reactive sputtering), and ion-beam sputtering. Preferably, both of the multi-layer films M1 and M2 on both sides of the substrate SU are formed by one of the just-enumerated processes.

An optical filter, like the infrared-cut filter mentioned above, that is used in a digital appliance such as a camera incorporated in a mobile phone is so thin as to be liable to break or be otherwise damaged when subjected to impact.

To avoid that, it is preferable that the multi-layer films M1 and M2 on both sides of the substrate SU both fulfill conditional formula (2) below.

$$|\sigma \times d| \geq 900 \tag{2}$$

where

σ represents the film stress (MPa/m); and d represents the film thickness (μm).

By providing, respectively on both sides of a substrate SU, multi-layer films M1 and M2 having compression stress such that the absolute value of the film stress σ multiplied by the film thickness d is equal to or greater than 900 Pa as expressed by conditional formula (2), it is possible to fabricate an optical filter FR that is less prone to break. For the multi-layer films M1 and M2 to fulfill conditional formula (2), it is preferable that the multi-layer films M1 and M2 on both sides of the substrate SU both have a thickness of 3.0 μm or more. However, if the multi-layer films M1 and M2 on both sides of the substrate SU both have a thickness of 9.0 μm or more, the multi-layer films M1 and M2 have so high compression stress as to cause the substrate SU to bend, leading to difficult handling. To avoid that, it is preferable that the multi-layer films M1 and M2 on both sides of the substrate SU both have a thickness less than 9.0 μm.

For the multi-layer films M1 and M2 to fulfill conditional formula (2), it is preferable to adopt a film deposition process that tends to produce compression stress. Specifically, it is preferable to form the multi-layer films M1 and M2 by ion-assisted deposition, ion-plating, reactive sputtering, or ion-beam sputtering.

It is still preferable that the multi-layer films M1 and M2 on both sides of the substrate SU both fulfill conditional formula (2a) below.

$$|\sigma \times d| \geq 1500 \tag{2a}$$

Conditional formula (2a) below defines, within the conditional range defined by conditional formula (2) above, a still preferable conditional range from the above-mentioned and other viewpoints. Thus, preferably, fulfilling conditional formula (2a) helps enhance the effects mentioned above.

By providing, respectively on both sides of a substrate, multi-layer films M1 and M2 having compression stress such that the absolute value of the film stress σ multiplied by the film thickness d is equal to or greater than 1500 Pa as expressed by conditional formula (2a), it is possible to fabricate an optical filter FR that is still less prone to break. For the multi-layer films M1 and M2 to fulfill conditional formula (2a), it is preferable that the multi-layer films M1 and M2 on both sides of the substrate SU both have a thickness of 4.0 μm or more but less than 9 μm. Particularly preferred conditional ranges include 5.0 μm or more but less than 9 μm, and 5.5 μm or more but less than 9 μm.

For the multi-layer films M1 and M2 to fulfill conditional formula (2a), it is preferable to adopt a film deposition process that tends to produce compression stress. Specifically, it is preferable to form the multi-layer films M1 and M2 by ion-assisted deposition, ion-plating, reactive sputtering, or ion-beam sputtering.

It is preferable that the substrate SU be formed of glass. Plastic substrates are unsuitable for deposition of a dielectric multi-layer film on them. Accordingly, as a reliable transparent substrate that provides certain strength as an optical filter FR and that in addition is free from exfoliation, a glass substrate is preferable to a plastic substrate.

It is preferable that the multi-layer films M1 and M2 on both sides of the substrate SU be both composed of at least two deposition materials and that at least one of them be $SiO_2$ or a mixture containing $SiO_2$. It is preferable that the multi-layer films M1 and M2 on both sides of the substrate SU be both composed of at least two deposition materials and that at least one of them be $TiO_2$, $Nb_2O_5$, $Ta_2O_5$, $ZrO_2$, or a mixture containing any of those. A low-refractive-index material such as $SiO_2$ and a high-refractive-index material such as $TiO_2$ are preferred in producing compression stress, are easy to manufacture, and are preferred also in terms of providing refractive indices required to achieve desired performance.

EXAMPLES

Hereinafter, different configurations and other features of optical filters according to the present invention will be described more specifically by way of practical and comparative examples.

As shown in Table 1, differently configured samples, namely Samples A1 to K1 and A2 to K2, of optical filters FR were fabricated by coating a substrate SU with a thickness t of 0.1 mm or 0.3 mm on both sides (sides A and B) with multi-layer films M1 and M2. The multi-layer films M1 and M2 were both a dielectric multi-layer film having a $TiO_2$/$SiO_2$ film structure. Specifically, the multi-layer films M1 and M2 were both composed of an alternate stack of high-refractive-index layers of $TiO_2$ and low-refractive-index layers of $SiO_2$. $TiO_2$ had a refractive index of 2.385 at a wavelength of 550 nm, and $SiO_2$ had a refractive index of 1.455 at a wavelength of 550 nm. For convenience' sake, $TiO_2$ is occasionally (as in Table 1, etc.) designated as TiO2, and $SiO_2$ as SiO2.

As to the film deposition process for the multi-layer films M1 and M2, in Table 1, IAD (Samples A1 to F1 and A2 to F2) is short for ion-assisted deposition, and VD (Samples G1 to K1 and G2 to K2) is short for vacuum deposition (with no ion-assist). Also listed in Table 1 are the film thickness d (μm) and the film stress σ (MPa/m) of the multi-layer films M1 and M2, and the value corresponding to conditional formula (2) or (2a), specifically |σ×d| (Pa). For film stress σ, a minus sign (−) indicates the compressing direction, and a plus sign (+) the tensile direction.

The film stress σ listed in Table 1 was measured in the following manner: a film was deposited on a strip-form glass substrate with t=0.3 mm; then the radius of curvature R of the sag was measured; then the film stress σ was calculated according to formula (ST) below. Here, as the strip-form glass substrate, a sheet of transparent glass was used; Es was assumed to be 6.6×10 N/m², and vs as 2.35×10⁻¹.

$$\sigma = (Es \times ts^2)/[6(1-vs)R \times tf] \tag{ST}$$

where

Es represents the Young's modulus of the strip-form glass substrate (N/m²);

vs represents the Poisson ratio of the strip-form glass substrate;

ts represents the thickness of the substrate (m);

R represents the radius of curvature (m); and tf represents the film thickness (m).

Table 2 lists, for each of Samples A1 to K1 and A2 to K2 of optical filters FR, the strength (unit: N), the strength ratio F, and an evaluation. The strength ratio F is the value corresponding to conditional formula (1) or (1a). Different indications of evaluation are as follows: with t=0.1 mm ((thickness/mm), where thickness is in mm)), F<1.4 was evaluated as "Poor", 1.4≤F<1.5 as "Good", and 1.5≤F as "Excellent"; with t =0.3 mm, F≤1.15 was evaluated as "Poor", 1.15≤F<1.2 as "Good", and 1.2≤F as "Excellent".

Figure 3:
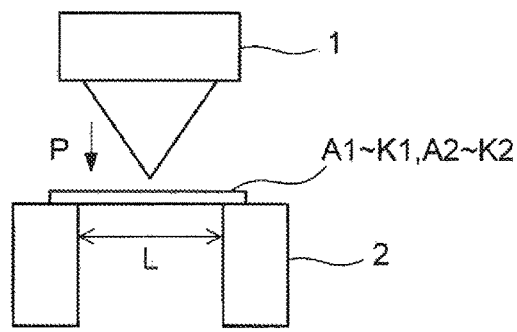
FIG. 3 is a diagram illustrating strength measurement on an optical filter.

As the strength of Samples A1 to K1 and A2 to K2, the breaking strength of the optical filter was measured on a testing machine as shown in FIG. 3. The breaking strength was measured on a digital force gauge, model ZP-200N, manufactured by Imada Co., Ltd. The testing machine was composed of a gauge head 1, measurement beds 2, etc. The measurement beds 2 were placed across an interval L of 4 mm from each other, and each of Samples A1 to K1 and A2 to K2 rested on them with an overlap of 1 mm at either end. The gauge head 1 had a point with a radius of curvature of R0.57 mm, and was brought down at a speed of 9 mm/min in the direction indicated by arrow P. Samples A1 to K1 and A2 to K2 each had a size of 6 mm by 6 mm, and all except Samples A1 and A2 had the multi-layer films M1 and M2 deposited on both sides respectively. The gauge head 1 was pressed against each of Samples A1 to K1 and A2 to K2 in the direction indicated by arrow P, and the value measured when the latter broke was taken as its strength.

Figure 4:
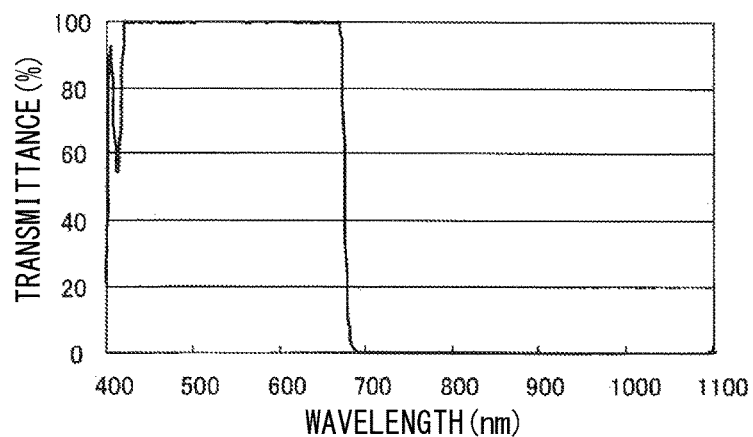
FIG. 4 is a plot of the spectral transmission of samples E1 and E2.

As shown in Tables 1 and 2, Samples D1 to F1 and D2 to F2 are practical examples, and Samples A1 to C1, G1 to K1, A2 to C2, and G2 to K2 are comparative examples. Now, with Samples E1 and E2 taken up as examples, their film structure, evaluation, etc. will be described in more detail. Substrates SU with thicknesses t of 0.1 mm and 0.3 mm respectively were each coated on both sides (sides A and B) with multi-layer films M1 and M2 as shown in Tables 3 and 4 on a vacuum film deposition machine to produce Samples E1 and E2 of optical filters FR. For both sides A and B, the multi-layer films M1 and M2 contained $TiO_2$ as a high-refractive-index material and $SiO_2$ as a low-refractive index material. The films were deposited by ion-assisted deposition, which tends to produce compression stress. The multi-layer film M1 on side A had a film thickness d of 4.3760 µm, and had a film stress σ of −366.6 MPa/m as compression stress. Accordingly, the value of |film stress σ×film thickness d| was 1604 Pa. On the other hand, the multi-layer film M2 on side B had a film thickness d of 4.2412 µm, and had a film stress σ of −384.8 MPa/m as compression stress. Accordingly, the value of |film stress σ×film thickness d| was 1632 Pa. FIG. 4 shows a plot of the spectral transmission of Samples E1 and E2.

TABLE 1

| Sample | | Film Structure | Deposition Process | Film Thickness d (µm) | Stress σ (MPa/m) | \|σ × d\| (Pa) |
|---|---|---|---|---|---|---|
| t = 0.1 mm | t = 0.3 mm | | | | | |
| Multi-Layer Film M1 on Side A | | | | | | |
| A1 | A2 | (Substrate Only) | — | 0 | 0 | 0 |
| B1 | B2 | TiO2/SiO2 | IAD | 1.1588 | −360.1 | 417 |
| C1 | C2 | TiO2/SiO2 | IAD | 2.3182 | −338.4 | 784 |
| D1 | D2 | TiO2/SiO2 | IAD | 3.2291 | −301.1 | 972 |
| E1 | E2 | TiO2/SiO2 | IAD | 4.3760 | −366.6 | 1604 |
| F1 | F2 | TiO2/SiO2 | IAD | 6.1110 | −320.9 | 1961 |
| G1 | G2 | TiO2/SiO2 | VD | 1.1619 | 16.8 | 20 |
| H1 | H2 | TiO2/SiO2 | VD | 2.3261 | 9.6 | 22 |
| I1 | I2 | TiO2/SiO2 | VD | 3.2834 | 12.3 | 40 |
| J1 | J2 | TiO2/SiO2 | VD | 4.3646 | 20.1 | 88 |
| K1 | K2 | TiO2/SiO2 | VD | 6.1553 | 12.7 | 78 |
| Multi-Layer Film M2 on Side B | | | | | | |
| A1 | A2 | (Substrate Only) | — | 0 | 0 | 0 |
| B1 | B2 | TiO2/SiO2 | IAD | 1.1505 | −342.6 | 394 |
| C1 | C2 | TiO2/SiO2 | IAD | 2.1050 | −338.5 | 713 |
| D1 | D2 | TiO2/SiO2 | IAD | 3.2435 | −342.0 | 1109 |
| E1 | E2 | TiO2/SiO2 | IAD | 4.2412 | −384.8 | 1632 |
| F1 | F2 | TiO2/SiO2 | IAD | 6.3291 | −329.5 | 2086 |
| G1 | G2 | TiO2/SiO2 | VD | 1.1623 | 13.2 | 15 |
| H1 | H2 | TiO2/SiO2 | VD | 2.1667 | 8.4 | 18 |
| I1 | I2 | TiO2/SiO2 | VD | 3.3013 | 10.5 | 35 |
| J1 | J2 | TiO2/SiO2 | VD | 4.2764 | 18.8 | 81 |
| K1 | K2 | TiO2/SiO2 | VD | 6.4120 | 11.5 | 73 |

TABLE 2

| Sample t = 0.1 thickness/mm | Strength (N) | Strength Ratio F | Evaluation | Sample t = 0.3 thickness/mm | Strength (N) | Strength Ratio F | Evaluation |
|---|---|---|---|---|---|---|---|
| A1 | 3.08 | 1.00 | Poor | A2 | 27.8 | 1.00 | Poor |
| B1 | 3.90 | 1.27 | Poor | B2 | 27.9 | 1.00 | Poor |
| C1 | 4.07 | 1.32 | Poor | C2 | 29.8 | 1.07 | Poor |
| D1 | 4.45 | 1.44 | Good | D2 | 32.1 | 1.15 | Good |
| E1 | 5.22 | 1.69 | Excellent | E2 | 33.8 | 1.21 | Excellent |
| F1 | 5.36 | 1.74 | Excellent | F2 | 35.4 | 1.27 | Excellent |
| G1 | 2.94 | 0.95 | Poor | G2 | 28.2 | 1.01 | Poor |
| H1 | 2.97 | 0.96 | Poor | H2 | 27.2 | 0.98 | Poor |
| I1 | 3.03 | 0.98 | Poor | I2 | 27.9 | 1.00 | Poor |
| J1 | 2.96 | 0.96 | Poor | J2 | 28.8 | 1.03 | Poor |
| K1 | 3.10 | 1.01 | Poor | K2 | 28.9 | 1.04 | Poor |

TABLE 3

Multi-Layer Film M1 on Side A

| Number of Layers | Material | Film Thickness (nm) |
|---|---|---|
| 1 | TiO2 | 10.41 |
| 2 | SiO2 | 35.68 |
| 3 | TiO2 | 103.92 |
| 4 | SiO2 | 156.28 |
| 5 | TiO2 | 85.38 |
| 6 | SiO2 | 145.31 |
| 7 | TiO2 | 81.39 |
| 8 | SiO2 | 142.42 |
| 9 | TiO2 | 79.78 |
| 10 | SiO2 | 141.23 |
| 11 | TiO2 | 78.94 |
| 12 | SiO2 | 140.67 |
| 13 | TiO2 | 78.45 |
| 14 | SiO2 | 140.37 |
| 15 | TiO2 | 78.16 |
| 16 | SiO2 | 140.20 |
| 17 | TiO2 | 77.99 |
| 18 | SiO2 | 140.07 |
| 19 | TiO2 | 77.92 |
| 20 | SiO2 | 139.96 |
| 21 | TiO2 | 77.95 |
| 22 | SiO2 | 139.87 |
| 23 | TiO2 | 78.07 |
| 24 | SiO2 | 139.80 |
| 25 | TiO2 | 78.29 |
| 26 | SiO2 | 139.78 |
| 27 | TiO2 | 78.69 |
| 28 | SiO2 | 140.03 |
| 29 | TiO2 | 79.67 |
| 30 | SiO2 | 141.45 |

TABLE 3-continued

Multi-Layer Film M1 on Side A

| Number of Layers | Material | Film Thickness (nm) |
|---|---|---|
| 31 | TiO2 | 83.93 |
| 32 | SiO2 | 154.74 |
| 33 | TiO2 | 22.54 |
| 34 | SiO2 | 9.55 |
| 35 | TiO2 | 130.53 |
| 36 | SiO2 | 10.42 |
| 37 | TiO2 | 17.13 |
| 38 | SiO2 | 151.39 |
| 39 | TiO2 | 86.77 |
| 40 | SiO2 | 144.27 |
| 41 | TiO2 | 86.17 |
| 42 | SiO2 | 147.66 |
| 43 | TiO2 | 25.10 |
| 44 | SiO2 | 5.67 |
| 45 | TiO2 | 53.39 |
| 46 | SiO2 | 78.63 |

TABLE 4

Multi-Layer Film M2 on Side B

| Number of Layers | Material | Film Thickness (nm) |
|---|---|---|
| 1 | TiO2 | 10.46 |
| 2 | SiO2 | 36.00 |
| 3 | TiO2 | 104.57 |
| 4 | SiO2 | 157.87 |
| 5 | TiO2 | 87.41 |
| 6 | SiO2 | 147.98 |
| 7 | TiO2 | 84.70 |
| 8 | SiO2 | 147.22 |
| 9 | TiO2 | 85.68 |
| 10 | SiO2 | 150.91 |
| 11 | TiO2 | 91.65 |
| 12 | SiO2 | 164.54 |
| 13 | TiO2 | 106.88 |
| 14 | SiO2 | 180.20 |
| 15 | TiO2 | 111.96 |
| 16 | SiO2 | 180.70 |
| 17 | TiO2 | 108.33 |
| 18 | SiO2 | 171.86 |
| 19 | TiO2 | 103.59 |
| 20 | SiO2 | 173.64 |
| 21 | TiO2 | 106.91 |
| 22 | SiO2 | 172.72 |
| 23 | TiO2 | 103.89 |
| 24 | SiO2 | 174.16 |
| 25 | TiO2 | 109.86 |
| 26 | SiO2 | 181.79 |
| 27 | TiO2 | 112.25 |
| 28 | SiO2 | 180.33 |
| 29 | TiO2 | 106.49 |
| 30 | SiO2 | 165.16 |
| 31 | TiO2 | 95.22 |
| 32 | SiO2 | 159.12 |
| 33 | TiO2 | 90.87 |
| 34 | SiO2 | 76.31 |

LIST OF REFERENCE SIGNS

FR optical filter
M1, M2 multi-layer film
SU substrate
imaging device
11 imaging lens
12 image sensor
A1 to K1, A2 to K2 sample

The invention claimed is:

1. An optical filter comprising a substrate with a thickness of 0.3 mm or less coated on both sides with multi-layer films respectively, wherein:
   the multi-layer films on both sides of the substrate are both formed by ion-assisted deposition, ion-plating, reactive sputtering, or ion-beam sputtering;
   the multi-layer films on both sides of the substrate both have compression stress; and
   conditional formula (1) below is fulfilled:

$$F \geq -1.25t + 1.525 \tag{1}$$

where
   F represents a strength ratio of the optical filter with respect to the substrate (a ratio of strength of the optical filter with a coated substrate to strength of an uncoated substrate); and
   t represents a thickness of the substrate (thickness/mm), where thickness is in mm.

2. The optical filter of claim 1, wherein the multi-layer films on both sides of the substrate both fulfill conditional formula (2) below:

$$|\sigma \times d| \geq 900 \tag{2}$$

where
   σ represents a film stress (MPa/m); and
   d represents a film thickness (μm).

3. The optical filter of claim 1, wherein the multi-layer films on both sides of the substrate both have a thickness of 3.0 μm or more.

4. The optical filter of claim 1, wherein the multi-layer films on both sides of the substrate both have a thickness less than 9.0 μm.

5. The optical filter of claim 1, wherein the substrate is formed of glass.

6. The optical filter of claim 1, wherein the multi-layer films on both sides of the substrate are both composed of at least two deposition materials, of which at least one is $SiO_2$ or a mixture containing $SiO_2$.

7. The optical filter of claim 1, wherein the multi-layer films on both sides of the substrate are both composed of at least two deposition materials, of which at least one is $TiO_2$, $Nb_2O_5$, $Ta_2O_5$, $ZrO_2$, or a mixture containing any of those.

8. The optical filter of claim 1, wherein the multi-layer films on both sides of the substrate are both formed by ion-assisted deposition.

9. The optical filter of claim 1, wherein conditional formula (1a) below is fulfilled:

$$F \geq -1.5t + 1.65 \tag{1a}$$

where
   F represents a strength ratio of the optical filter with respect to the substrate (a ratio of strength of the optical filter with a coated substrate to strength of an uncoated substrate); and
   t represents a thickness of the substrate (thickness/mm), where thickness is in mm.

10. The optical filter of claim 1, wherein the multi-layer films on both sides of the substrate both fulfill conditional formula (2a) below:

$$|\sigma \times d| \geq 1500 \tag{2a}$$

where
    σ represents a film stress (MPa/m); and
    d represents a film thickness (μm).

11. The optical filter of claim 1, wherein: the multi-layer films on both sides of the substrate both have a thickness of 4.0 μm or more but less than 9 μm.

12. The optical filter of claim 1, wherein the multi-layer films on both sides of the substrate both have a thickness of 5.0 μm or more but less than 9 μm.

13. The optical filter of claim 1, wherein the multi-layer films on both sides of the substrate both have a thickness of 5.5 μm or more but less than 9 μm.

14. The optical filter of claim 1, wherein the multi-layer films on both sides of the substrate both have such a property as to transmit light in a visible region and reflect light in an infrared region.

15. An imaging device, comprising:
the optical filter of claim 14;
an imaging lens disposed on a light-entrance side of the optical filter; and
an image sensor that receives light incident thereon through the imaging lens and the optical filter.

16. The optical filter of claim 1, wherein the multi-layer films on both sides of the substrate are both composed of 30 or more layers.

17. The optical filter of claim 1, wherein the Strength Ratio F is up to about 1.74.

18. An optical filter comprising a substrate with a thickness of 0.3 mm or less coated on both sides with multi-layer films respectively, wherein:
the multi-layer films on both sides of the substrate both have compression stress; and
conditional formula (1) below is fulfilled:

$$F \geq -1.25t + 1.525 \tag{1}$$

where
F represents a strength ratio of the optical filter with respect to the substrate (a ratio of strength of the optical filter with a coated substrate to strength of an uncoated substrate); and
t represents a thickness of the substrate (thickness/mm), where thickness is in mm.

19. The optical filter of claim 18, wherein the Strength Ratio F is up to about 1.74.

* * * * *